United States Patent

Luhrs

[15] 3,678,220

[45] July 18, 1972

[54] ANGULATED POSITIONING MARKS FOR MOVING WEB

[72] Inventor: Otto R. Luhrs, Boulder, Colo.

[73] Assignee: International Business Machines Corporation, Armonk, N.Y.

[22] Filed: May 26, 1971

[21] Appl. No.: 147,004

[52] U.S. Cl. ..................................179/100.2 S, 340/174.1 B

[51] Int. Cl. ......................................G11b 5/56, G11b 21/10

[58] Field of Search ............................340/174.1 B, 174.1 C; 179/100.2 MD, 100.2 S

[56] References Cited

UNITED STATES PATENTS

| | | | |
|---|---|---|---|
| 2,803,988 | 8/1957 | Ranger | 179/100.2 C |
| 2,832,839 | 4/1958 | Muttly | 179/100.2 C |
| 2,929,670 | 3/1960 | Garrity | 179/100.2 C |
| 3,263,031 | 7/1966 | Welsh | 340/174.1 |

*Primary Examiner*—Vincent F. Canney
*Attorney*—Hanifin & Jancin and Homer L. Knearl

[57] ABSTRACT

Lateral position of a moving web is detected to an accuracy of tenths of a mil. In particular, a moving magnetic tape is monitored for shifts in lateral position by detecting "V" shaped marks on the tape. Each arm of the "V" is monitored by a separate transducer. The transducers are positioned relative to the "V" mark so that, for a predetermined lateral position of the moving tape, there is no time difference between each transducer reading its corresponding arm of the "V" mark. Shifts in lateral position from the predetermined position are then detected by the time difference between pulses from each transducer. The lateral position detector may be used in a servo loop to guide the web so that it always remains at the predetermined lateral position. In addition, by inserting an artificial time difference in the servo loop, the lateral position of the web may be indexed to any given position relative to the predetermined position.

8 Claims, 6 Drawing Figures

ANGULATED POSITIONING MARKS FOR MOVING WEB

BACKGROUND OF THE INVENTION

This invention relates to detecting the lateral position of a moving web. More particularly, the invention relates to detecting the lateral position of a high-speed moving magnetic tape wherein, because of track densities, it is necessary to have extremely accurate lateral position guiding of the web down to and in the order of tens of thousandths of an inch.

Web guiding is a highly developed and old art. It originally was directed toward controlling the movement of conveying belts or controlling the movement of paper stock or textile stock. More recently, the advent of magnetic tape recorders has been responsible for a resurgence in inventions for guiding moving webs.

As the demands increase for magnetic recording of data at higher speed and density, the demands on guiding systems for the magnetic tape are much more stringent. It can be expected that magnetic tape recordings of data in the future will approach several tens of thousands flux reversals per inch and, similarly, a thousand or more tracks per inch across the width of the magnetic tape. With such high bit and track density, extremely accurate magnetic tape guiding is required. When the track density is a thousand tracks per inch, a lateral shift of the tape by 0.001 inch would cause the magnetic heads to shift to the next adjacent track, thereby confusing the data. To achieve highly accurate tape guiding, it is first necessary to be able to detect very small lateral shifts in position. For track densities of a thousand tracks per inch, it will be necessary to detect lateral shifts in position down to ten thousandths of an inch.

Present lateral position detectors for moving webs may be categorized as edge sensors or mark sensors. Edge sensors have been of four types: magnetic, pneumatic, optic, and sonic. In each case, the edge sensor detects lateral position by monitoring the amount of web which is effecting the signal picked up by the transducer. In the case of magnetic sensors, the edge of the web is recorded with a signal, and the strength of that signal at the pickup or read head indicates the extent to which the web is covering the read head.

The pneumatic, optic, and sonic edge detectors all position a source of signal opposite a signal detector at the edge of the moving web. As the moving web shifts laterally between the source and the sensor, the amount of signal picked up by the sensor varies in amplitude.

All of the edge sensors are ineffective in extremely accurate web guiding simply because of variations in the edge of the magnetic tape. In other words, in terms of thousandths of an inch, the edge of the magnetic tape is irregular; therefore, edge detection to this accuracy is limited by the quality of the slitting and/or wear of the magnetic tape.

The alternative to edge sensing is mark sensing. For example, a guide track on a magnetic tape may be sensed with two read heads. The read heads are placed side-by-side so that, when centered over the guide track, the amplitude from the two read heads is the same. A shift in lateral position is then detected by changes in relative amplitude between the signals read by each head. The deficiency in this type of detection is that separation between the track and the read heads is critical. Variations in amplitude between the signals from each read head are more apt to be due to variations in separation between the heads and the tape rather than to shifts in lateral position of the tape relative to the heads. This is especially a problem in high speed systems where the web is moving at 1,000 inches per second or faster, and it is thus desirable for the tape to fly over the head without contacting it. Any variation of the flying height would then distort the lateral position detection signal from the two amplitude sensing heads.

All lateral position detectors to date utilizing mark sensing have been amplitude detectors as described above. Time difference detection of marks in two separate guide tracks has been utilized to detect magnetic tape skew but has not been used to detect lateral position. To detect skew, the marks recorded on the tape are usually recorded near each edge and are positioned transverse, or at 90°, to the direction of movement of the web. Read heads then read the marks at each edge. When there is no skew, the time occurrence of detecting a mark near each edge is simultaneous. Any time difference between the detection of marks at each edge will indicate that the tape is skewed at some angle to the direction of motion. Guiding apparatus is then provided to correct for the skew condition. This tape skew detection apparatus is not capable of detecting a shift in lateral position as such a shift has no effect on the time difference between pulses from each read head.

It is the object of this invention to improve the accuracy of web guiding by enhancing the accuracy to which lateral position shift of a moving web can be detected.

It is a further object of this invention to detect a shift in lateral position with apparatus that is insensitive to variations in the roughness of the edge of the moving web or separation between a magnetic tape and the read head.

SUMMARY OF THE INVENTION

In accordance with this invention, the above objects are accomplished by using two indicia to be carried by the moving web, orienting the indicia so that they form an angle with respect to each other and transducing the two indicia whereby the time difference between the transducing of the two indicia is indicative of the lateral position of the moving web. The transducing means is positioned so that its effective read track crosses the two indicia. For a predetermined position of the transducing means, there will be a predetermined time difference between the occurrence of output pulses resulting from the transducing of each indicia. A time difference detector will then monitor deviations in time difference from the predetermined time difference to detect a shift in lateral position of the moving web from the predetermined position.

The two indicia may be categorized as a reference indicia and a lateral position indicia. The significance is that the two indicia are at different angles relative to the direction of motion of the moving web. Therefore, as the web moves under the transducing means, there will be a time difference between when the reference indicia is transduced and the lateral position indicia is transduced. This time difference may be equated to the lateral position of the moving web relative to the transducing means.

The configuration of the indicia on the moving web would typically take the form of a "V" mark in which case the transducing means would consist of two transducers — one transducer for each arm of the "V." Alternative configurations would have the position indicia and the reference indicia placed alternately in the same track along the direction of motion of the moving web, in which case, only one transducer would be required. In the latter case, the two indicia could be two marks or a continuous mark from a first edge to a second edge where the two edges thereby correspond to two marks.

The above lateral position detecting apparatus may be combined with a servoing operation to align the web with transducers. The shift in lateral position is thus fed back to a device for changing the lateral position of the web or the position of the transducers in order to align the tracks on the web with the transducers.

As another feature of the invention, an artificial time difference may be introduced and used to position the moving web relative to the transducers. In other words, using the lateral position detector in a servo loop and further inserting an artificial time difference, the effect is to change the predetermined position to which the moving web is aligned by the servo loop. Thus, the lateral position detector can be used as a part of a track accessing system.

The invention will be described herein in the environment of a magnetic tape utilizing magnetic heads to read the angular marks. Of course, the marks could be implemented in any number of ways such as optical marks or perforations in a moving web. The reading transducer would then be either an optical sensor, or a pneumatic sensor, or a sonic sensor as required.

The great advantage of the invention is its accuracy in detection of lateral position of the web. Shifts in lateral position in the order of tens of thousandths of an inch have been easily detected. This is not a limit on the system as even greater accuracy could be achieved by varying such parameters as the speed of the web, size of the transducer relative to the angular mark, and frequency of a clock used in time difference detection of signals from the transducing means.

The foregoing and other objects, features, and advantages of the invention will be apparent from the following more particular description of preferred embodiments of the invention, as illustrated in the accompanying drawings.

DETAILED DESCRIPTION

Figure 1:
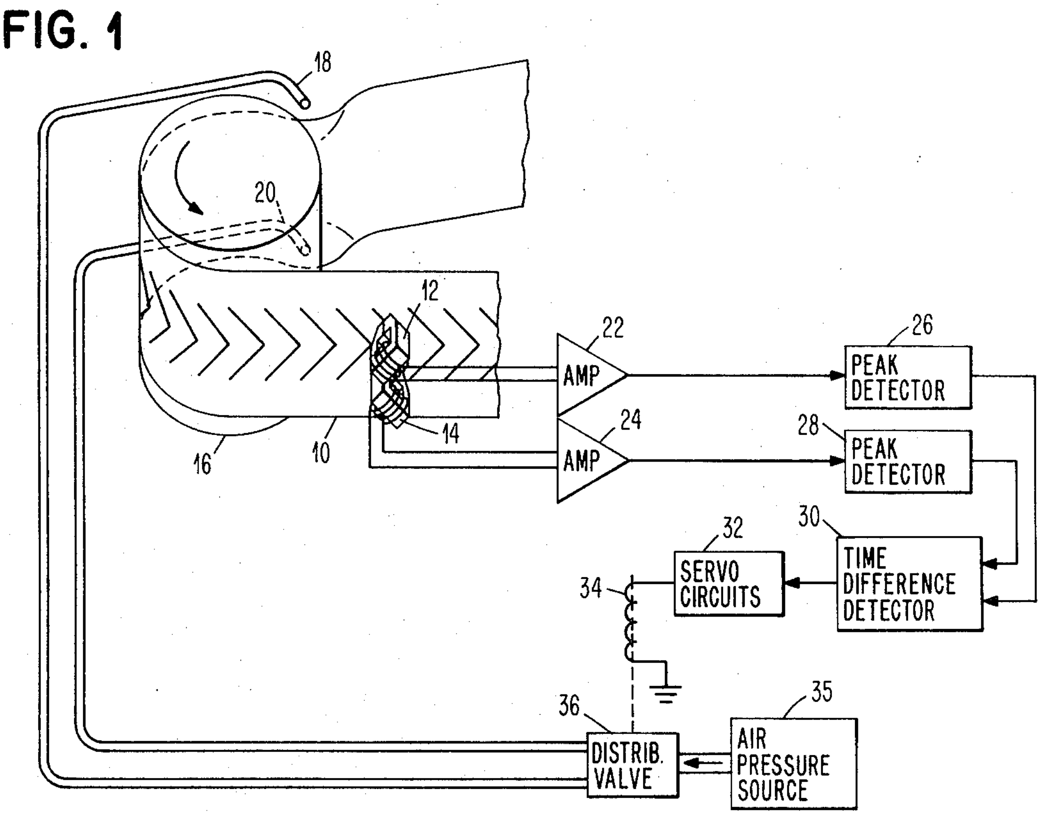
FIG. 1 shows a preferred embodiment of the lateral position detecting invention used in a servo loop having pneumatic jets to steer the magnetic tape to the predetermined lateral position.

Referring now to FIG. 1, a preferred embodiment of the lateral position detection apparatus using a "V" mark is shown. The "V" guide mark is located at the center of the magnetic tape, and two read heads are positioned at the same angle of each arm of the mark to detect each arm of the mark.

The angular orientation of each arm of the "V" mark is preferably at 45° to the direction of motion. However, any angular orientation other than 90° or 0° to the direction of motion of the tape will operate satisfactorily. The position of the "V" mark in the center of the tape is preferable so as to avoid erroneous time difference detection due to tape skew. The invention may be operated with each arm of the "V" separated and positioned at any location across the width of the tape. Also, the size of the "V" mark and the size of the read heads is greatly exaggerated in the drawing for clarity of illustration. More typically, the track width of each arm of the "V" mark is about 75 mils, and the effective track width of the read head is about 5 mils. These values are not critical to the operation of the invention. It is desirable to provide a track width for each arm of the "V" which is wide enough to handle the maximum lateral displacement of the moving web.

In FIG. 1, the invention is depicted as utilizing magnetic tape with read heads to sense the guiding marks. It will be appreciated by one skilled in the art that the lateral position of any moving web could be detected by using a pneumatic, optic, or sonic sensing system with appropriate optical mark or perforation in the moving web. The important cooperation is the angular orientation of each arm of the "V" mark with the position of a transducing means to read each arm of the mark.

In operation of the preferred embodiment in FIG. 1, tape 10 is driven past the transducers 12 and 14. Cylinder 16 would typically be a drive capstan for moving the tape 10. Lateral position of the tape 10 is changed by controlling the flow from air jets 18 and 20. An even air pressure from air jets 18 and 20 against the tape 10 will cause the tape to hold a lateral position. A differential in the air pressure striking the tape 10 from the jets 18 and 20 will will cause the tape 10 shift laterally on the capstan 16.

Each arm of the "V" mark on tape 10 is read by the transducers 12 and 14 whose signals are amplified by amplifiers 22 and 24. The amplified signals are then peak-detected and shaped into square pulses by peak detecting circuits 26 and 28. The difference in time between the leading edge of the pulses from peak detectors 26 and 28 is detected by the time difference detector 30. The output from detector 30 is a signal indicating the position of the tape 10 laterally relative to a predetermined position, i.e., lateral position error signal.

The lateral position error signal is passed to the servo circuits 32. The servo circuits 32 drive coil 34 to move distributing valve 36 to change the distribution of air pressure to air jets 18 and 20. The change in the fluid flow from jets 18 and 20 against the tape 10 cause the tape 10 to shift laterally to a position to reduce the lateral position error signal from time difference detector 30 to zero. Thus, the lateral position detecting invention, as shown in FIG. 1, is used in the servo loop to control the lateral position of a moving magnetic tape.

Figures 2A, 2B, 2C:
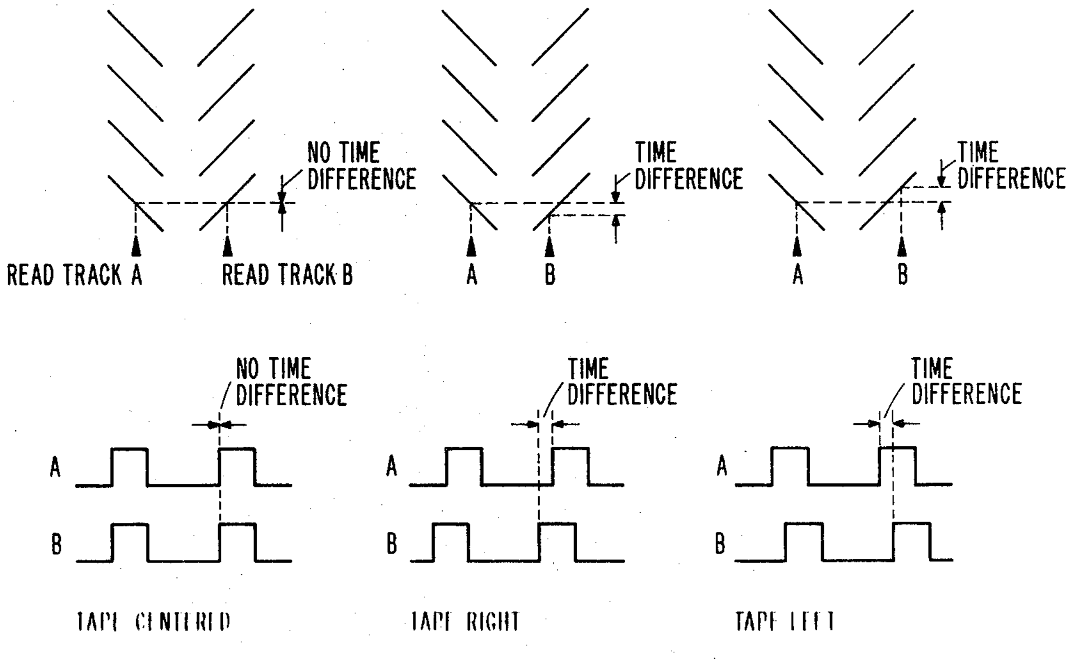
FIGS. 2*a*, 2*b*, and 2*c* show the time difference between output pulses from the read heads as the web shifts laterally relative to the read heads.

In FIGS. 2*a*, 2*b*, and 2*c*, the alignment between each arm of the "V" mark and each arm's associated transducer is depicted along with the waveforms out of the peak detectors 26 and 28 of FIG. 1. For clarity of illustration, the transducers are represented by arrowheads labeled A and B, and the waveforms they are responsible for are correspondingly labeled.

In FIG. 2*a*, the transducers A and B are positioned in line across the width of the tape, and the "V" mark is centered between the transducers. Accordingly, there is no time difference between the leading edge of the waveforms produced by the transducers A and B. In FIG. 2b, the lateral position of the web has shifted to the right. Therefore, transducer B will detect its arm of the "V" mark prior to transducer A detecting its arm of the "V" mark. Accordingly, the leading edge of the pulses in the B waveform precede the leading edge of the pulses in the A waveform. Finally, in FIG. 2*c*, the web has shifted laterally to the left resulting in the leading edge of pulses due to transducer A occurring before the leading edge of pulses due to transducer B.

To understand the accuracy of this lateral position detecting system, let us assume that the magnetic tape is moving at 1,000 inches per second, and the "V" marks are oriented with each arm at 45° to the direction of motion of the tape. Under these conditions, a lateral shift of one mil will cause a time difference of two microseconds between the leading edges of the waveforms A and B. Therefore, a one microsecond difference corresponds to a lateral shift in position of 0.5 mil. By utilizing a reference clock oscillator in the time difference detector, time differences of smaller than a microsecond can be detected improving the accuracy of the system easily to ten thousandths of a mil.

From the above, it can be seen that the accuracy of this system is dependent upon the tape speed, the angular orientation of the arms of the "V" marks, and the frequency of the reference clock oscillator used in the time difference detector. If there is any limitation to accuracy of the system, it may lie in the speed of the electronics, and the speed of electronic circuitry can be expected to improve as circuit components become more sophisticated.

Figure 3:
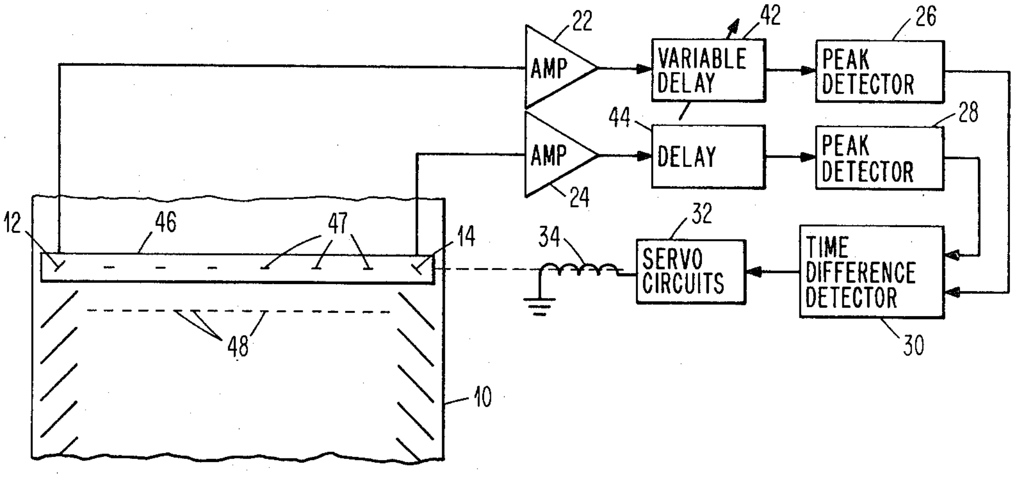
FIG. 3 shows the lateral position detecting invention with additional apparatus for inserting an artificial time difference and also shows use of the lateral position detecting apparatus in a servo loop for indexing magnetic transducers to align with different tracks on a magnetic tape.

Referring now to FIG. 3, the lateral position detection invention is shown with an additional apparatus for inserting an artificial time difference. Similar functional blocks, in FIGS. 1 and 3, are correspondingly numbered. The additional apparatus in FIG. 3 is a fixed delay 44 between amplifier 24 and peak detector 28 and a variable delay 42 between amplifier 22 and peak detector 26. Also, in FIG. 3, the driving coil 34 is depicted as moving all of the magnetic read heads represented in position as dashes on a bar 46.

Read heads 12 and 14 are oriented at an angle to read the arm of the "V" marks, and the remaining transducers represented by dashes 47 on the transducer mounting bar 46 are spaced across the width of the tape. Information tracks on the tape 10 are represented by the dashes 48 between the arms of the "V" mark.

In operation, FIG. 3 is identical to FIG. 1 except that the insertion of an artificial time difference by the delays 42 and 44 adds the capability of altering the predetermined lateral position of alignment between tape 10 and the magnetic heads on bar 46. The artificial time difference is the difference in delay between the fixed delay 44 and the variable delay 42. This artificial time difference is added to the actual time difference between marks picked up by transducers 12 and 14. Accordingly, the output of the peak detectors 26 and 28 will be pulses similar to waveforms A and B of FIGS. 2*a*, 2*b*, and 2*c* except that the time difference will now represent the sum of the actual time difference due to transducers 12 and 14 detecting the marks and the artificial time difference inserted by delays 42 and 44.

Time difference detector 30 operates in the same manner as FIG. 1 to produce a lateral position error signal. The lateral position error signal is used by servo circuit 32 to drive coil 34 which then moves mounting bar 46 to align the transducers on the bar 46 so that the lateral position error is reduced to zero. Because of the insertion of the artificial time difference, alignment between tape 10 and transducers 47 may be varied by adjusting the delay 42 to effectively index the information heads 47 to appropriate information tracks 48.

Figure 4:
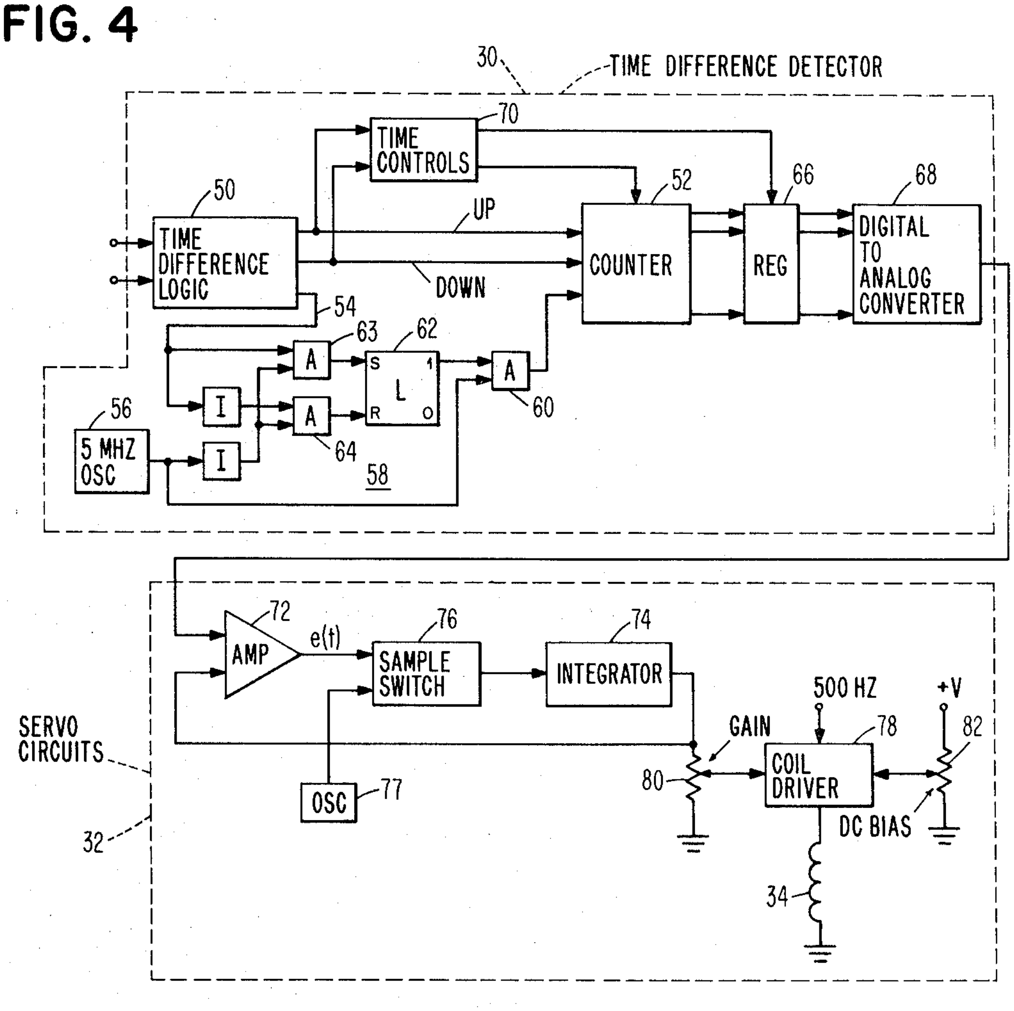
FIG. 4 is a detailed block diagram of the time difference detector and the servo circuits used in FIGS. 1 and 3.

In FIG. 4, the details of the time difference detector 30 and the servo circuits 32 are shown. The input signals to the time difference detector are the A and B waveforms of FIGS. 2*a*, 2*b*, and 2*c* as supplied by the peak detectors 26 and 28. The time difference logic 50 compares waveforms A and B of FIGS. 2*a*, 2*b*, and 2*c* and generates three output signals. Two of the output signals are applied to the counter 52 and indicate whether the time difference represents a movement to the left or a movement to the right in lateral position of the web. If the movement is to the right, the counter is counted up and, if the movement is to the left, the counter is counted down.

A third output signal from the time difference logic is a signal on line 54 which is up for the duration of the time difference between the leading edges of waveforms A and B in FIGS. 2*a*, 2*b*, and 2*c*. This signal is used with the clock signal from a 5 MHz oscillator 56 by logic indicated at area 58. The logic enables AND gate 60 to pass clock pulses from the oscillator 56 to the counter 52. Counter 52 then advances in the up or down direction once for each clock pulse passed by the AND gate 60.

The purpose of the logic at area 58 is to ensure that AND gate 60 is enabled at least for a full single clock pulse from oscillator 56. In operation, when line 54 is up, latch 62 will be set by AND gate 63 during the next negative half-cycle of oscillator 56. AND gate 60 will then pass the next positive half-cycle from the oscillator 56 to advance the counter 52 one count. Counter 52 will be continually advanced one count at a time until AND gate 60 is inhibited. AND gate 60 is inhibited when the signal on line 54 drops and the next negative half of a clock cycle enables AND gate 64 to reset latch 62.

As can be seen from above, the purpose of counter 52 is to translate the duration of the time difference between waveforms A and B into a digital quantity. This digital quantity can then be transferred to register 66 where it is used to drive a digital-to-analog converter 68. Thus, the output of the D-to-A converter 68 is a signal whose level is representative of the time difference between the leading edges of pulses in waveforms A and B in FIGS. 2*a*, 2*b*, and 2*c*.

Time controls 70 in the time difference detector of FIG. 4 respond either to the up or down signal from the time difference logic 50 to generate signals to reset the counter 52 and the register 66. Each time the time difference logic indicates a new time difference is being received, the time control resets the counter 52 to a mid-point value in the capacity of the counter, so that the counter can be counted up or down from that mid-point value. A short time later, after the time duration has been converted to a count in counter 52, time controls 70 enable registers 66 to be reset to the new value of the count in counter 52.

As previously pointed out, the analog signal from the D-to-A converter 68 in the time difference detector represents the lateral position error. This lateral position error is applied to amplifier 72 in the servo circuits 32 of FIG. 4. Amplifier 72 is a difference amplifier which amplifies the difference between the later position error and the output from integrator 74. The difference signal out of amplifier 72 is sampled by a sample switch 76 every few milliseconds and the applied to the integrator 74. The sampling interval is specified by the frequency of the signal from oscillator 77. Effectively, integrator 74 maintains a history of lateral position error which is periodically updated by switch 76 sampling the difference signal from amplifier 72. The output from integrator 74 is applied directly to the coil driver 78 which drives coil 34 in FIGS. 1 and 3.

The output from integrator 74 is applied to the coil driver 78 through a potentiometer 80 so as to adjust the gain in the signal being applied to coil 34. In addition, a DC bias is applied to the coil driver circuit 78 from potentiometer 82. The DC bias is necessary if the mechanism being driven by coil 34 is spring-loaded. Finally, coil driver 78 also is driven by a 500 Hz dither signal which is used to reduce the hysteresis in the mechanism driven by coil 34. In other words, a 500 Hz vibration is superimposed on the mechanism driven by coil 34 to increase the speed of response of the mechanism to the correction signal from integrator 74.

Furthermore, in an alternative embodiment, the marks or indicia on the moving web may be along a single track of the web with reference indicia and position indicia being alternated along the track. It is only required that there be some angle between the reference indicia and the lateral position indicia. A single transducer may then be used to detect the time difference between transducing the reference indicia and the lateral position indicia. Because of the angle between the two indicia, the variation in the time difference detected will be indicative of variation in lateral position of the moving web. For example, the reference indicia and lateral position indicia together could form a "V" mark pointing across the width of the web rather than along the length of the web. There are, of course, any number of variations on the configuration of the indicia, and it is only important that the two indicia form an angle relative to each other.

While the invention has been particularly shown and described with reference to preferred embodiments thereof, it will be understood by those skilled in the art that various changes in form and details may be made therein without departing from the spirit and scope of the invention.

What is claimed is:

1. Apparatus fro measuring the lateral position of a moving web relative to a predetermined lateral position:
   - reference indicia carried by the moving web, the reference indicia oriented at a first angle relative to the direction of motion of the web;
   - lateral position indicia carried by the moving web, the position indicia oriented at a second angle to the direction of motion of the web other than said first angle;
   - means for transducing both of said indicia, the read track position of said transducing means being such that when the web is in the predetermined position, there is a predetermined time difference between the transducing of the reference indicia and the position indicia;
   - means for detecting the amount of deviation of the time difference from the predetermined time difference and thereby measuring the lateral position of the moving web relative to the predetermined position.

2. The apparatus of claim 1 and in addition:
   - means for changing the lateral position of the moving web in response to the deviation detected by said detecting means so that the lateral position of the moving web is controlled.

3. The apparatus of claim 1, and in addition:
   - means for inserting a variable artificial time difference whereby the predetermined position against which the lateral position of the web is measured may be varied.

4. The apparatus of claim 3 and in addition:

means for changing the lateral position of the moving web in response to the time difference detected by said detecting means so that the lateral position of the moving web may be changed by changing the artificial time difference supplied by said inserting means.

5. In a web guidance system for guiding a moving web and having marks recorded on two guide tracks on the web, one transducer per guide track for reading the marks, and a time difference detector for detecting the time difference between marks read by each transducer, improved lateral position detecting apparatus comprising:

said marks being recorded at an angle other than 0° to the direction of motion of the web and to each other together so that the marks from the two guide tracks effectively from "V" marks on the web;

said transducers positioned with one transducer to cross each arm of the "V" whereby each transducer will generate an output pulse when it intersects its arm of the "V", and the time difference between the output pulses as detected by said detecting means will indicate the lateral position of the moving web relative to the centered position of the web when the bottom of the "V" is centered between the transducers.

6. The apparatus of claim 5 and in addition:

means responsive to the detected time difference for aligning the web with the transducers.

7. The apparatus of Claim 6 wherein said aligning means comprises:

means for directing two fluid streams against the moving web near each edge of the web as the web approaches a rotary support so that differential force between the two streams as they impact the web will steer the web to a new lateral position;

means responsive to the lateral position signal for distributing fluid between the two streams of said directing means whereby the two streams are inversely related in fluid flow, and the flow in each stream is proportional to the lateral position signal.

8. The apparatus of claim 5 and in addition:

means for inserting an artificial time difference between the occurrence of the output pulses so that said detecting means detects the sum of the artificial time difference and the actual time difference;

means responsive to the sum of the time differences for shifting the lateral position of the moving web to a position specified by the artificial time difference.

* * * * *

Disclaimer and Dedication

3,678,220.—*Otto R. Luhrs*, Boulder, Colo. ANGULATED POSITIONING MARKS FOR MOVING WEB. Patent dated July 18, 1972. Disclaimer and dedication filed Aug. 28, 1972, by the assignee, *International Business Machines Corporation.*

Hereby disclaims and dedicates to the Public the entire term of said patent.

[*Official Gazette December 26, 1972.*]